Dec. 28, 1954 H. SCHUSTER 2,698,387
VARIABLE INDUCTOR CAPACITOR TUNER
Filed Feb. 15, 1952
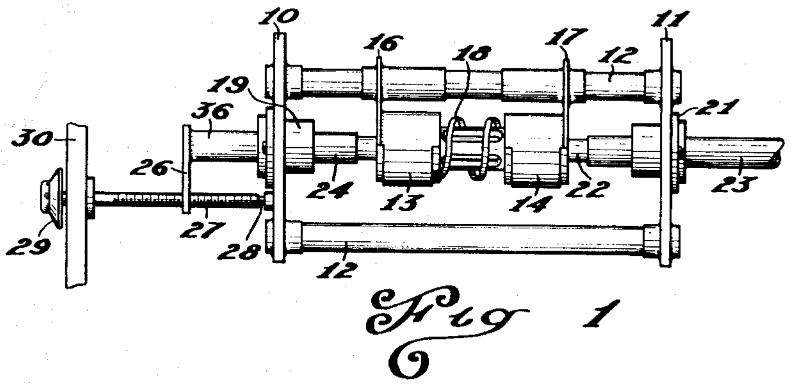
Fig 1
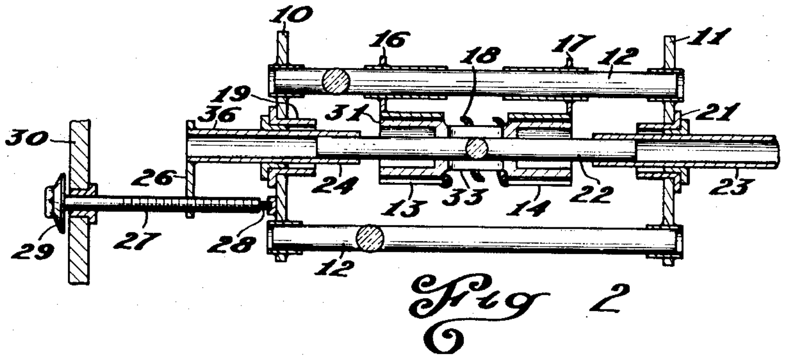
Fig 2
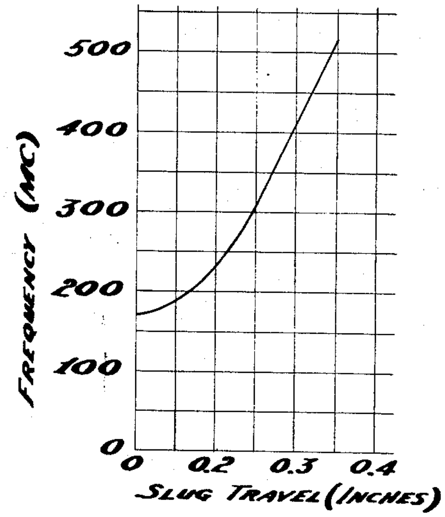
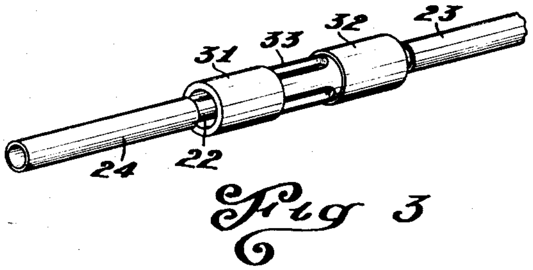
Fig 3
Fig 4
INVENTOR.
HARRY SCHUSTER
BY
Marvin Moody
ATTORNEY United States Patent Office 2,698,387
Patented Dec. 28, 1954

2,698,387

VARIABLE INDUCTOR CAPACITOR TUNER

Harry Schuster, Cedar Rapids, Iowa, assignor to Collins Radio Company, Cedar Rapids, Iowa, a corporation of Iowa Application February 15, 1952, Serial No. 271,704

3 Claims. (Cl. 250—40)

This invention relates in general to a high frequency tuner and in particular to a combination inductor-capacitor which may be tuned over a relatively wide range and which has wide bandwidth.

In electronics it is oftentimes desirable to have a tuneable circuit which may be used over a wide tuning range so that a small number of components may be used to cover the desired range of the equipment.

It is an object of this invention therefore, to provide a tuneable circuit which has a wide tuning range.

Another object of this invention is to provide a combination inductor-capacitor wherein both elements are variable simultaneously to obtain a wide tuning range.

A feature of this invention is found in the provision for a pair of tuning sleeves mounted on a shaft and separated by longitudinal supporting means that are axially movable through a pair of drums which have a coil of wire mounted between them.

Further objects, features and advantages of this invention will become apparent from the following description and claims when read in view of the drawings, in which;

Figure 1 is a side view illustrating the tuner of this invention;

Figure 2 is a sectional view;

Figure 3 is an isometric view of the tuning slug of this invention; and,

Figure 4 is a frequency versus slug travel characteristic curve.

Figure 1 illustrates a pair of end plates 10 and 11 which are separated by standoffs 12 which are made of insulating material. A pair of hollow cylindrical members 13 and 14 are attached to one of the standoffs 12 by suitable brackets 16 and 17, respectively. The members 13 and 14 are made from a suitable conducting material as for example, silver plated copper. An inductance wire 18 is formed into a spiral and mounted between the cylinders 13 and 14. The spiral 18 may be made of silver plated material and may be welded to the edges of cylinders 13 and 14.

A pair of bearings 19 and 21 are mounted on the end plates 10 and 11. An insulating tuning shaft 22 is slidably received in a guide member 23 mounted in bearing 21. A portion 24 is slidably received through bearing 19 and is connected to the opposite end of shaft 22. One end 36 of the portion 24 has a threaded projection 26 which is threadedly received on a lead screw 27. The lead screw 27 has its end 28 rigidly attached to the plate 10 and has a knob 29 mounted at the other end on a face plate 30 for tuning the apparatus. Terminal connections may be made to brackets 16 and 17.

The shaft 22 has mounted thereon a pair of sleeves 31 and 32 which are separated by longitudinal spacers 33 that are mounted at a diameter smaller than the outer diameter of the sleeves 31 and 32. The sleeves 31 and 32 are of the same length as the cylinders 13 and 14 and have an outside diameter such that there is a slight air gap between the members. The distance between the sleeves 31 and 32 is substantially equal to the length of one of the sleeves. The cylinders 13 and 14 react with the sleeves 31 and 32 as capacitances whereas, the spiral 18 reacts with the sleeve 31 as a variable inductor.

In operation, as the knob 29 is rotated, the shaft 22 moves longitudinally through guides 19 and 23 thus changing the coupling between the sleeves 31 and 32 and the cylinders 13 and 14. Simultaneously the sleeve 31 moves into the confines of the spiral 18 so as to vary the effective inductance of the device.

This is shown in Figure 4 which illustrates slug travel from a zero position such as shown in Figure 2 versus the resonant frequency of the tuner. It is to be noted that the particular tuner from which the curve was taken is tuneable from 165 to 510 megacycles which is a wide tuning range at this frequency. The bandwidth over the tuning range is 10 megacycles which is broad.

The sleeves 31 and 32 and the joining strips 33 are silver plated and when the sleeve 31 is within the confines of spiral coil 18 it becomes a shorted turn and decreases the total inductance by one-half. When the sleeves 31 and 32 are not within the confines of spiral 18, the slotted portion 33 has little or no effect on the total inductance. The capacitance is a function of the area of overlap between the cylinders 13 and 14 and the sleeves 31 and 32. The capacitance is relatively small which is advantageous at these high frequencies.

It is seen that this invention provides a combination variable inductor-capacitor which may be tuned over a wide range and which has broad bandwidth.

The members 12 and 22 should be insulated from each other so as to prevent the inductance and capacitance elements from being shorted out. This may be accomplished by making these members of insulating material or alternatively by separating them by insulating material. As shown in Figure 2 the member 22 is of insulating material.

Although this invention has been described with respect to a particular embodiment thereof, it is not to be so limited as changes and modifications may be made therein which are within the full intended scope of the invention as defined by the appended claims.

I claim:

1. A broad band tuner comprising, a pair of end plates, standoffs connecting said end plates together, a pair of hollow cylindrical members supported by one of said standoffs with their center openings in axial alignment, a tuning shaft slidably received between said end plates and passing through said cylindrical members, a spiral conducting member mounted between said cylindrical members, a pair of sleeves mounted on said tuning shaft and adaptable to pass through said cylindrical members, and a plurality of longitudinal joining strips connecting said sleeves together.

2. A broad band tuning mechanism comprising a pair of end plates, standoffs connecting said end plates, a pair of hollow cylindrical members supported by one of said standoffs with their center openings in axial alignment, a tuning shaft slidably received through said end plates and passing through the openings of said cylindrical members, a pair of sleeves mounted on said tuning shaft, a plurality of longitudinal strips joining said sleeves together, a spiral conductor between the first and second cylindrical members, and means for moving said tuning shaft longitudinally through the cylindrical members.

3. A broad band tuning mechanism comprising, supporting means, a pair of hollow cylindrical members supported by said supporting member with their center openings in axial alignment, a tuning shaft slidably supported by said supporting means and passing through the cylindrical members, a spiral conducting member mounted between said cylindrical members, a pair of sleeve members supported on said tuning shaft and receivable through said cylindrical members, a plurality of longitudinal connecting strips joining said sleeves, insulating means electrically separating the cylindrical members from the sleeve members, and means for moving said tuning shaft relative to the cylindrical members.

References Cited in the file of this patent

UNITED STATES PATENTS

| Number | Name | Date |
|---|---|---|
| 2,389,986 | Koch | Nov. 27, 1945 |
| 2,440,269 | Hargrove | Apr. 27, 1948 |
| 2,565,263 | Ehrlich | July 31, 1951 |